United States Patent [19]

Meginnis

[11] 4,302,940

[45] Dec. 1, 1981

[54] PATTERNED POROUS LAMINATED MATERIAL

[75] Inventor: George B. Meginnis, Indianapolis, Ind.

[73] Assignee: General Motors Corporation, Detroit, Mich.

[21] Appl. No.: 48,132

[22] Filed: Jun. 13, 1979

[51] Int. Cl.$^3$ .............................................. F02C 7/18

[52] U.S. Cl. ..................................................... 60/754

[58] Field of Search ................. 60/754, 755, 756, 757; 428/137, 138; 416/97 A

[56] References Cited

U.S. PATENT DOCUMENTS 4,004,056 1/1977 Carroll ................................. 60/754

4,168,348 9/1979 Bhangu et al. ........................ 60/754

*Primary Examiner*—Robert E. Garrett

*Attorney, Agent, or Firm*—J. C. Evans

[57] ABSTRACT

A transpiration air cooled combustor for use with gas turbine engines includes an annular wall of laminated readily deformable metal having plural layers of diffusion bonded material in a combustor wall with inner and outer surfaces; each of the inner and outer surfaces has pores formed therein by a process such as photoetching to provide numerous inlets on the outer surface of the combustor wall for directing cooling air through the wall to a plurality of outlets in the inner surface for flow of cooling air across the inner surface; and wherein at least two surfaces of the layers includes a plurality of continuously formed curvilinear grooves communicating with the inlets and outlets and also intersecting one another to form crossover passages between the grooves for communicating the inlets and outlets and wherein the curved grooves serve to produce minimal surface distortion and stretch marks across curvilinear portions of the outer wall portion of the combustor assembly to prevent formation tears therein whereby the combustor construction has a uniform flow of coolant from the exterior thereof to the interior thereof throughout the full surface extent of the wall of the combustor.

5 Claims, 9 Drawing Figures

PATTERNED POROUS LAMINATED MATERIAL

This invention relates to improvements in porous laminated material for gas turbine engine combustors and other such devices which are protected from high temperature gas by discharge of a cooling gas through numerous pores distributed over the surface of the combustors or a like high temperature operating device. This mode of cooling is referred to as transpiration cooling.

This invention is particularly adapted to transpiration cooled combustors with laminated porous metal walls of the general sort described in prior patent applications, of common ownership with this application, as follows. U.S. Pat. No. 3,584,972, issued June 15, 1971, to Bratkovich and Meginnis, for LAMINATED POROUS METAL; U.S. Ser. No. 862,859, filed Dec. 21, 1977, by Sweeney and Verdouw, for GAS TURBINE ENGINE COMBUSTOR MOUNTING, and U.S. Ser. No. 887,879, filed Mar. 20, 1978, by Herman and Reider, for POROUS LAMINATED COMBUSTOR STRUCTURE. These turbine engine combustors have laminated walls, the layers of which have grooves and/or holes which are formed in the surface of the layer by a process such as photoetching to provide numerous inlets and outlets for cooling air or other gas between the exterior and interior of the combustor. Combustors or other structures with porous laminated walls to be protected from hot gas by transpiration cooling will be referred to hereafter in this specification as "combustors."

Combustor apparatus for gas turbine engines typically includes a plurality of generally axially directed pierced or louvered sleeve segments comprising air distribution systems to provide wall cooling of the liner segments of a combustor apparatus to prevent excessive flame erosion of the inside surface of combustor walls. Examples of such system are set forth in U.S. Pat. Nos. 3,064,424, issued Nov. 20, 1962, to Tomlinson; 3,064,425, issued Nov. 20, 1962, to C. F. Hayes; and 3,075,352 issued Jan. 29, 1963, to L. W. Shutts.

While the aforesaid gas turbine engine combustors are suitable for their intended purpose, it is desirable to minimize flow of coolant air required to cool the inner wall of the combustion apparatus against flame erosion. Various proposals have been suggested to make the full wall of the combustor apparatus of porous material to cool the internal wall surface of the combustor apparatus. One such arrangement is set forth in U.S. Pat. No. 3,557,553, issued Jan. 26, 1971, to Schmitz, wherein porous metal fiber is compressed to provide a controlled amount of inlet coolant flow through pores in a mixing shirt and thence into a combustion chamber so as to obtain transpiration cooling of the interior wall of the combustion chamber. Another proposal for providing for a plurality of perforations to produce transpiration cooling effects on the interior wall of a combustion chamber is set forth in U.S. Pat. No. 3,623,711, issued Nov. 30, 1971, to Thorstenson. In both of these arrangements the upstream end of the combustion liner is imperforate to define structural support for the liner apparatus within a gas turbine engine.

Combustor apparatus of the type including porous laminated walls with multiple layers of material, diffusion bonded together and including pores in the inner and outer layers interconnected by intermediate groove patterns between the laminated layers of the wall requires a resultant structure of sufficient strength to contain the pressure differential from the outside to the inside of the combustor and, furthermore, must consider manufacturing costs attendant to formation of such complex porous laminated air cooled structures. Minimum cost can be obtained by reducing the number of layers in the porous metal laminate from a three ply laminate to a bi-ply laminate which maintains a total wall thickness equivalent to that found in three layer laminates used in porous wall combustor assemblies, provided that the lesser internal area provides adequate cooling.

A further consideration is that the final laminate, whether three layer or bi-ply, must be of sufficient compressive strength to permit it to be formed into complex shapes or curvatures such as occur in gas turbine engine combustor assemblies and to do so by an arrangement that eliminates tensile failures during the forming or drawing operations. For example, in combustor formation the dome of the combustor can be drawn through a sharp radius to form an edge that is then connected to axially extending porous wall segments of a combustor as more specifically is set forth in U.S. Ser. No. 887,879, filed Mar. 20, 1978, by Herman and Reider for POROUS LAMINATED COMBUSTOR STRUCTURE.

In prior arrangements, extensive effort has been direced to chemical etching of the layers of the laminated material as set forth in U.S. Pat. No. 3,584,972, issued June 15, 1971, to Bratkovich and Meginnis for LAMINATED POROUS METAL. In order to maintain a total laminate thickness in the order of 0.060 inches for desirable strength and formability, and to retain maximum cooling, it has been found that groove patterns of the type set forth in the aforesaid Bratkovich et al patent may produce excessive reduction of the metal sections when evaluated against cooling and part fabrication requirements.

To avoid excessive stress by providing maximum laminate strength, attention has been given to the groove patterns within the porous laminated sheets to determine if improved formability can be obtained without adversely affecting permeability characteristics.

Accordingly, an object of the present invention is to provide an improved porous laminated metal construction including at least two layers of material having inlet pores formed on one side thereof and outlet pores formed on the other side thereof intercommunicating with a crossing groove pattern formed inwardly of the porous metal material to achieve the maximum bonded area and compressive strength of the laminated metal porous wall and to reduce tensile failure by forming or drawing the material and wherein the serpentine cross grooves of the structure have a symmetrical cross section which is more stable to long term oxidation to eliminate thin wall sections in one side of the laminated wall while minimizing outer surface distortion and stretch marks when the material is formed so that the permeability of the wall between the inlet and outlet pores will be maintained following forming of the wall into curved shapes.

Another object of the present invention is to provide an improved combustor apparatus for use in gas turbine engines including a tubular porous metal liner with pore-like perforations therethrough and cross grooves between layers of porous metal in the combustion apparatus liner and wherein a serpentine cross groove pattern is included to prevent excessive surface distortion during formation of the combustor wall curvatures.

Still another object of the present invention is to provide an improved gas turbine combustor assembly having a porous metal liner from the inlet to the outlet thereof and wherein the liner is a porous laminated wall with inlet pores across a porous metal layer exposed to the annular combustion air passage of a gas turbine engine to permit air to enter the porous metal wall and including an intermediate layer with crossed, serpentine grooves in opposite faces to direct inlet air to exit through pores in the inside layer of the porous metal wall at a point to cool the full extent of the inner surface of the combustion liner and wherein a serpentine cross groove pattern is configured to prevent excessive surface distortion during formation of the combustor wall curvatures.

Yet another object of the present invention is to provide an improved gas turbine engine combustor formed with a porous laminated metal sleeve continuously perforated between the inlet and outlet of the combustor and including a wall having a radius of curvature therein and wherein inlet pores through an outer wall layer communicate with intersecting, serpentine cross grooves in the wall to form a path through a solid metal connection between the outer layer and an inner layer of the wall and wherein the cross grooves prevent excessive tension in the outer wall layer to minimize blockage of coolant flow through the wall for maximum cooling of the inner surface of the wall member.

Further objects and advantages of the present invention will be apparent from the following description, reference being had to the accompanying drawings wherein a preferred embodiment of the present invention is clearly shown.

Figure 3:
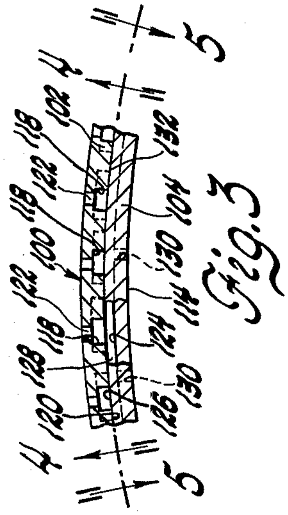
FIG. 3 is a fragmentary enlarged, sectional view taken along line 3—3 of FIG. 1.
Figure 2:
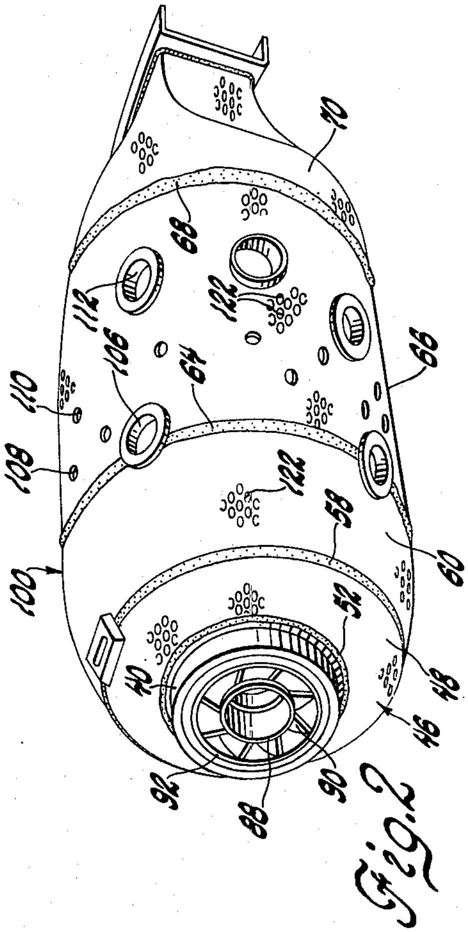
FIG. 2 is a view in perspective of the combustor apparatus in FIG. 1.
Figure 4:
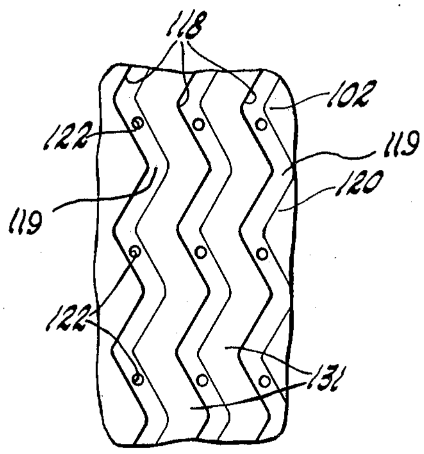
Figure 5:
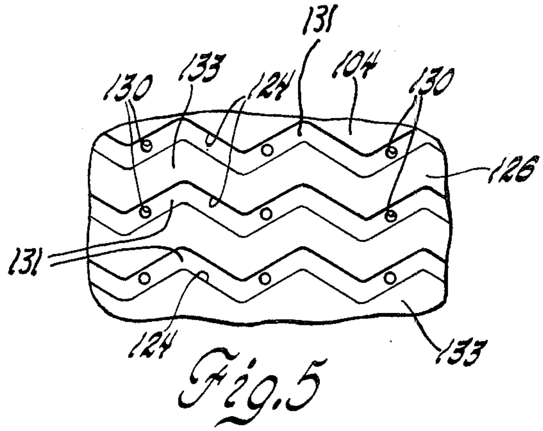
Figure 6:
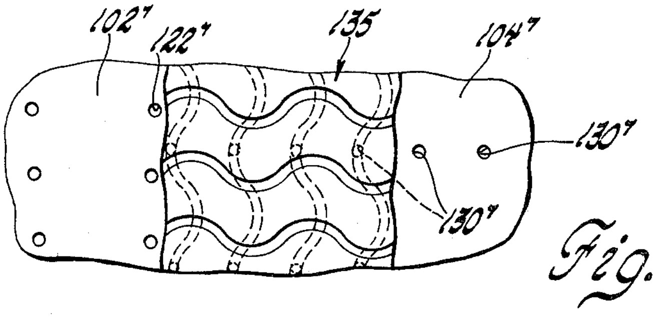
Figure 7:
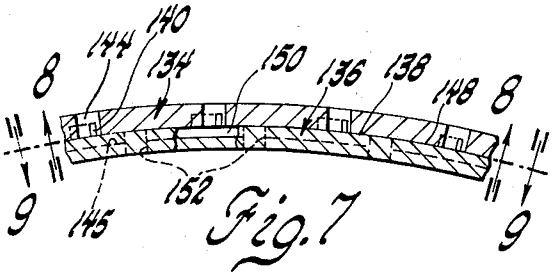
Figure 8:
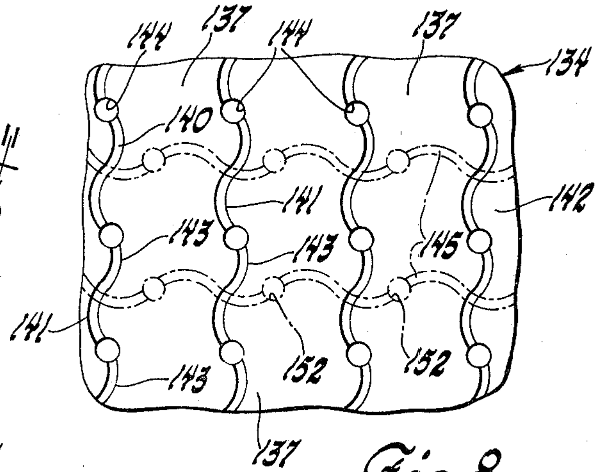
Figure 9:
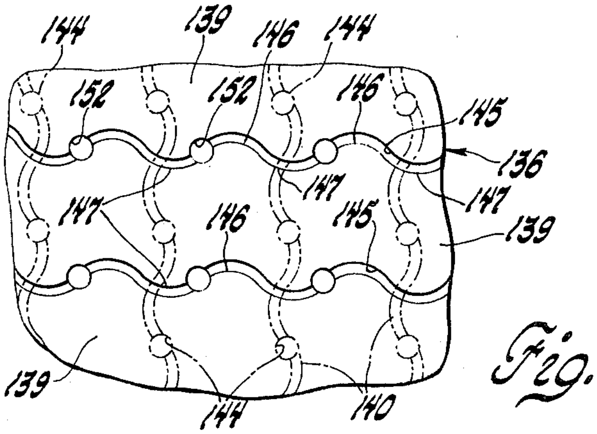

FIGS. 4 and 5 are fragmentary, enlarged sectional views taken along lines 4—4, and 5—5 of FIG. 3, respectively;

FIG. 6 is a fragmentary broken away elevational view of a second embodiment of the invention including three layers of metal;

FIG. 7 is an enlarged, fragmentary view of a third embodiment of the present invention; and FIGS. 8 and 9 are fragmentary sectional views taken along the lines 8 and 9, respectively of FIG. 7.

Figure 1:
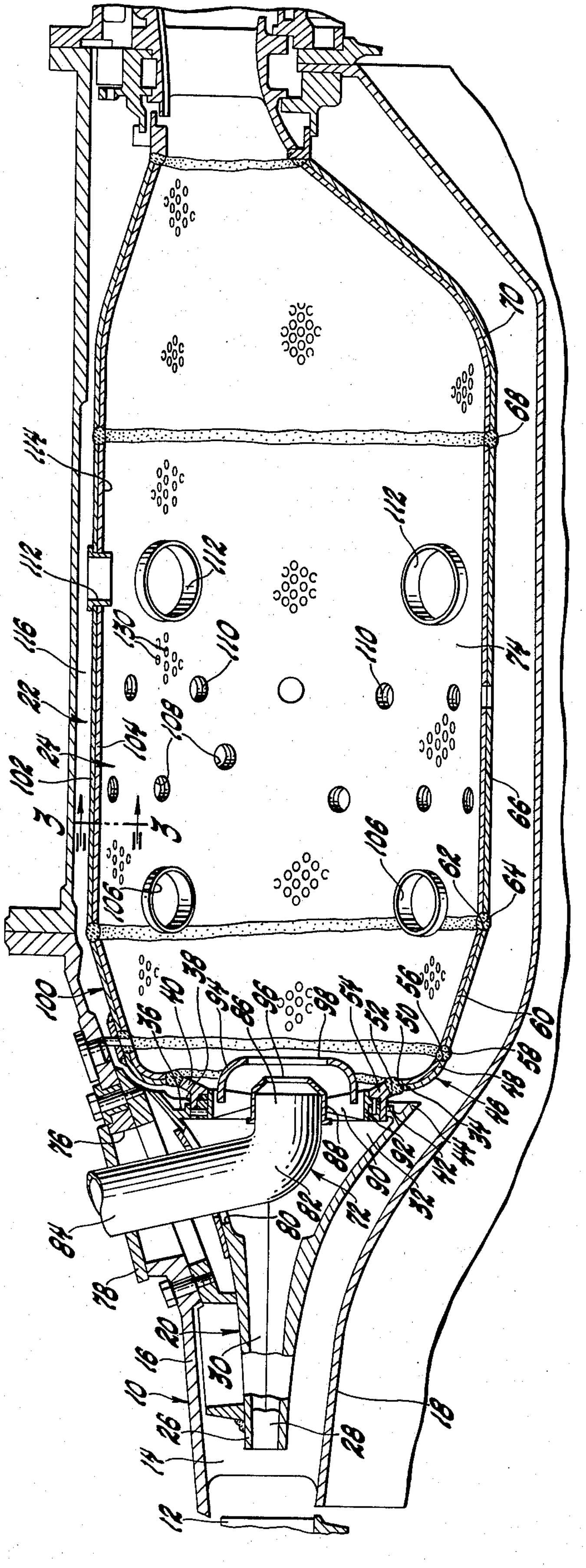
FIG. 1 is a longitudinal sectional view of a combustor apparatus in accordance with the present invention.

Referring now to the drawings, FIG. 1 shows a portion of a gas turbine engine 10 having a compressor 12 of the axial flow type in communication with a discharge duct 14 defined by a first radially outer annular engine wall 16 and a second radially inwardly located annular engine wall 18.

An inlet diffuser member 20 is located downstream of the discharge duct 14 to distribute compressed air from the compressor 12 to a combustor assembly 22 including a porous laminated wall 24 constructed in accordance with the present invention.

The member 20 has a low profile inlet 26 located approximately at the midpoint of the duct 14. A flow divider plate 28 is located in the inlet 26 to uniformly distribute compressed air flow into a radially divergent flow passage 30 in member 20 which is contoured to define a generally circular outlet 32 at the inlet end 34 of the combustor assembly 22.

The diffuser member 20 includes a downstream shoulder 36 that is supportingly received by the outer annular surface 38 of a rigid support ring 40. A support shoulder 42 on the member 20 is in engagement with the ring 40 to center an upstream extending annular lip 44 at the outlet of the inlet diffuser member 20 and to locate it in a radially spaced relationship with the ring 40 to direct coolant flow against the upstream end of a dome 46 of the combustor assembly 22.

The dome 46, more particularly, is made up of a first contoured ring 48 of porous laminated material that includes a radially inwardly located edge portion 50 thereon secured by an annular weld 52 to a radially outwardly directed flange 54 on the support ring 40. Downstream edge 56 of ring 48 is connected by an annular weld 58 to a radially outwardly divergent contoured ring portion 60 of dome 46 also of porous laminated material. The contoured ring 60 has its downstream edge 62 connected by an annular weld 64 to a porous laminated sleeve 66 which is connected by means of an annular weld 68 to a flow transition member 70 of porous laminated material.

Ring 40 also forms a housing for an air blast fuel atomizer assembly 72 that directs air and fuel into a combustion chamber 74 within the porous laminated sleeve 66.

In the illustrated arrangement, the wall 16 includes an access opening 76 and a mounting pad 78 that is in alignment with an opening 80 in the upper part of the inlet diffuser member 20 to provide access for a fuel nozzle 82 of assembly 72. Nozzle 82 includes a generally radially outwardly directed stem 84 thereon and a nose portion 86 that is supported by an inner ring 88 of the assembly 72.

The nozzle 82 has a plurality of inclined vanes 90 directed radially between the inner ring 88 and an outer shroud ring 92. The vanes 90 are angled to the longitudinal axis of the combustor assembly 22 to produce a swirling action in air flow from the flow passage 30 into the combustion chamber 74. An intermediate annular guide ring 94 directs the swirled air radially inwardly for mixing with fuel from an outlet orifice in the nozzle 82 to thoroughly mix air/fuel to improve combustion within the chamber 74 during gas turbine engine operation. Lips 96 and 98 are formed inboard of rings 88, 94, respectively, to atomize fuel spray that mixes with air blast from the vanes 90.

In accordance with the present invention, the liner 100 of the combustor assembly 22 is defined by the contoured rings 48, 60 and sleeve 66 to produce a transpiration cooled wall construction that minimizes the requirement for wall cooling air while adequately cooling the inside surface of the combustor assembly 22 exposed to the flame front within the combustion chamber 74.

Each segment of porous laminated liner 100 as shown in FIGS. 3–5 is made up of a plurality of porous layers or sheets 102, 104. The pores have a diameter such that the liner 100 has a discharge coefficient of 0.006 per square inch of liner wall area. Air distribution into combustor assembly 22 includes 11.5% of total air flow via assembly 72. A front row of primary air holes 106 receives 14.5% of total air flow; a pair of rows of intermediate air holes 108, 110 receives 8% and 5.6%, respectively, of the total combustor air flow. Dilution air holes 112 in sleeve 66 receive 35.8% of the total combustor air flow.

The remainder of the total combustor air flow is through the liner wall pores. The aforesaid figures are representative of flow distributions in combustors using the invention. Cooling of the inner surface 114 of liner 100 is in part due to transpiration cooling as produced by flow of compressed air from a duct 116 surrounding combustor assembly 22 to a point radially inwardly of the liner 100 through a plurality of pores and grooves therein in accordance with the present invention.

In fabrication of combustor assemblies such as combustor assembly 22 disclosed above, it is desirable to have a specifically configured pattern of pores and grooves in the layered material making up the laminate to improve the strength of the wall section as well as to reduce manufacturing costs thereof.

In the embodiment of the invention illustrated in FIGS. 3 through 5, the two-plate laminate includes the outer layer 102 and the inner layer 104 as set forth. The layer 102 includes a plurality of serpentine like grooves 118 formed across the inner surface 120 thereof. At spaced points the outer layer 102 has holes or pores 122 etched therein which intersect the serpentine passages 118 along the length thereof. Each of the adjacent holes 122 is communicated with a bent segment 119 of groove 118 formed between each of the adjacent holes 122. The pores 122 define inlet openings from the duct 116 to direct cooling air therefrom to the grooves 118. The inner layer 104 also includes a plurality of serpentine like grooves 124 therein that are formed along the surface 126 of the inner layer 104 which is juxtaposed to surface 120. The serpentine grooves 124 are formed in a cross relationship with respect to the grooves 118 of the outer layer 102 to form intersecting passages 128 wherein inlet air flow from the pores 122 will pass through the grooves 118 and transfer at the passage 128 into the grooves 124. Cooling air thence flows through a plurality of etched outlet holes 130 in the inner layer 104 which intersect grooves 124 for flow of cooling air from the porous laminated liner 100 of the combustor assembly 22 to produce a transpiration cooling of the inner wall surface of the combustor assembly 22. Each groove 124 has a bent segment 131 therein between each of adjacent holes 130 which intersect the groove 124. The serpentine or curvilinear groove pattern formed by bends 119 as shown at the grooves 118, 124 of the embodiment in FIGS. 3 through 5 produce a desirable improvement in the formability of the porous laminated liner 100 when it is shaped from a flat surface configuration into a curvilinear configuration such as is found in combustor assemblies or other gas turbine engine parts operating in a high temperature environment. The improved formability reduces tension in the outer layer of the part being formed, represented, by the layer 102 in the embodiment of FIGS. 3 through 5 and, accordingly, the arrangement produces minimal surface distortion on the outer surface of the combustor 22 and any stretch marks produced by the deformation are more or less discontinuous. While in the illustrated arrangement a bi-ply or two layer construction is shown in the porous laminated liner 100, the pores 122' and 130' can be formed in separate inner and outer layers 102', 104' and the grooves can be formed on opposite sides of a single center layer 135 if it is desirable to have a three ply configuration as shown at FIG. 6. It has been observed that the bi-ply configurations produce a greater flow than three ply because, if the overall thickness of the laminated material remains the same, the two ply or two layer construction is arranged so that each of the individual layers will have a slightly greater thickness than the thickness of the three ply configuration. As a result, the pores that are photoetched or otherwise machined in the two ply construction can have a slightly greater diameter than in the three ply construction while maintaining desired strength characteristics.

A further feature of the present invention is that facing surfaces 120, 126 define a substantial surface area for bonding the layers of material together. To be more specific, regarding the scale of the parts to be bonded together, in the embodiments of FIGS. 3 through 5 the individual sheets have a thickness in the order of 0.030 inches and the hole spacing of the pores 122, 130 is in the order of 0.136 inches. The pores and the grooves having the pattern set forth above are preferably obtained by photoetching processes wherein the individual layers of the sheet are etched or otherwise formed and are then united into a laminate by a suitable diffusion bonding process at an interface 132 which is produced in the porous laminated liner 100 during the fabrication process at lands 131, 133 formed on sheets 102, 104, respectively.

Representative types of high temperature alloys which are suitable for use in forming porous material having the configuration set forth in the embodiments in FIGS. 3 through 5 are set forth in the tabulation below. Such materials are resistant to extremely high temperature operation in environment such as gas turbine engines.

| Name | AMS Spec. | Cr | Co | Mo | Ti | W | Al | Fe | Ni |
|---|---|---|---|---|---|---|---|---|---|
| Hastelloy X | 5,536 | 22 | 1.5 | 9.0 | — | 0.6 | — | 18.5 | Base. |
| Waspaloy | 5,544 | 19.5 | 13.5 | 4.3 | 3.0 | — | 1.4 | — | " |
| Rene | 5,545 | 19 | 11 | 10 | 3.0 | — | 1.5 | 5.0 | " |
| Udimet 500 | — | 18 | 17 | 4 | 3 | — | 3 | — | " |
| Udimet 700 | — | 15 | 8.5 | 5 | 3.4 | — | 4.5 | — | " |

In the embodiment of FIGS. 7 through 9, a second configuration of porous laminated material suitable for use in high temperature environments to provide transpiration cooling of a hot surface portion thereon, such as the inner surface of a combustor assembly and/or the outer surface of a turbine vane or turbine blade assembly can be obtained with a ratchet shaped bonding pad that includes an outer layer or sheet 134 bonded to an inner layer or sheet 136 by a suitable diffusion bonding process to form a bonded joint 138 therebetween at lands 137, 139 thereon, respectively. In this embodiment of the invention, the outer layer 134 is on the exterior of a combustor assembly and the inner layer 136 is in facing relationship to a combustion chamber therein which respresents a high temperature working environment for the laminated material. In accordance with certain principles of the present invention, the layers 134, 136 are deformable without excessive build-up of tension in the outer layer 134 by the provision of a plurality of spaced, continuously formed serpentine ratchet like grooves 140 with peaks 141 and valleys 143 formed in the inner surface 142 thereof. Each of these grooves 140 intersects a plurality of inlet holes or pores 144 formed through the layer 134. The peaks 141 and valleys 143 define a groove bend between each of the adjacent holes or pores 144. The grooves 140 of the illustrated ratchet pad configuration intersect a second plurality of continuously formed serpentine ratchet like grooves 145 with peaks and valleys 146, 147 formed in the bonded surface 148 of the inner layer 136. As in the case of the first embodiment of the invention, the points of intersection between the grooves 140 and 145 define the cross flow passages 150 therebetween so that inlet air flow from the pores 144 will flow in a cross pattern to a plurality of outlet holes or pores 152 formed in the inner layer 136. The peaks 146 and valleys 147 define a groove bend between each of the adjacent holes 152 intersecting individual ones of the grooves 145. Again, as in the first embodiment, the serpentine pattern of the grooves 140, 145 results in maximum net cross-sectional area in all possible planes through the laminate resulting in the least possible deformation in the fibers farthest from the neutral is when the layers 134, 136 are formed into a curved shape as in the case of a combustor assembly or a like turbine engine component operating in a high temperature environment. Furthermore, the arrangement retains a mid-range of permeability which permits it to be manufactured in a bi-ply construction as shown in the embodiments in FIGS. 7 through 9 or as a three ply construction wherein the grooves 140, 145 are formed on opposite faces of a separate center piece and the inlet pores 144 and outlet pores 152 are formed in outer and inner layers of the porous laminated material, respectively.

While the embodiments of the present invention, as herein disclosed, constitute a preferred form, it is to be understood that other forms might be adopted.

The embodiments of the invention in which an exclusive property or privilege is claimed are defined as follows:

1. A porous laminated material for use in an air cooled gas turbine engine component comprising a first sheet and a second sheet, means for defining a plurality of continuously formed serpentine grooves between said first and second sheets, a plurality of holes directed through each of said first and second sheets having a portion thereof in intersecting relationship with said serpentine grooves, each of said first and second sheets having a land portion thereon intermediate said grooves, means for bonding said land portions together, said serpentine grooves having a crossing pattern to form a crossover passage between said grooves, said holes in one of said sheets serving to direct coolant into said serpentine grooves for flow therethrough to said crossover passages and for return flow through said serpentine grooves for flow from the holes in the other of said sheets for cooling the laminated material by transpiration cooling, each of said serpentine grooves having a bend formed therein between each of adjacent ones of the holes which intersect individual ones of said serpentine grooves producing relief between said first and second sheets to prevent excessive surface distortion and stretch marks across a sheet of the laminated material as it is tensioned during formation thereof so as to prevent tears in the surface thereof thereby to maintain a uniform flow of coolant therethrough.

2. A porous laminated material for use in an air cooled gas turbine engine component comprising a first sheet and a second sheet, means for defining a plurality of continuously formed serpentine grooves between said first and second sheets, a plurality of holes directed through each of said first and second sheets having a portion thereof in intersecting relationship with said serpentine grooves, each of said first and second sheets having a land portion thereon intermediate said grooves, means for bonding said land portions together, said serpentine grooves having a crossing pattern to form a crossover passage between said grooves, said holes in one of said sheets serving to direct coolant into said serpentine grooves for flow therethrough to said crossover passages and for return flow through said serpentine grooves for flow from the holes in the other of said sheets for cooling the laminated material by transpiration cooling, said serpentine grooves producing relief between said first and second sheets to prevent excessive surface distortion and stretch marks across a sheet of the laminated material as it is tensioned during formation thereof so as to prevent tears in the surface thereof thereby to maintain a uniform flow of coolant therethrough, a third dual faced sheet located between said first and second sheets, said meanings for defining a plurality of continuously formed serpentine grooves including a first plurality of grooves formed partially through one face of said third sheet and a second plurality of grooves formed partially through the other face of said third sheet in intersecting relationship to said first plurality of grooves, said crossover passages being formed at intersecting points between said first and said second plurality of grooves.

3. A porous laminated material for use in an air cooled gas turbine engine component comprising a first sheet and a second sheet, a first plurality of continuously formed serpentine grooves formed through part of the depth of each of said first and second sheets, a plurality of holes directed through each of said first and second sheets having a portion thereof in intersecting relationship with said serpentine grooves, each of said first and second sheets having a land portion thereon intermediate said grooves therein, means for bonding said land portions together to locate said grooves in said first and second sheets in an intersecting relationship with one another to form crossover passages from said grooves in said first sheet to grooves in said second sheet, said holes in said one sheet serving to direct coolant into said first grooves thence for flow therethrough to said crossover passages and for return flow through said grooves in said second sheet for flow from the holes therein for cooling thee laminated material by transpiration cooling, each of said first and second plurality of serpentine grooves having a bend formed therein between each of adjacent ones of the holes which intersect individual ones of said serpentine grooves defining relief between said first and second sheets to prevent excessive surface distortion and stretch marks across the tensioned portion of the laminated material during its formation so as to prevent tears in the surface thereof thereby to maintain a uniform flow of coolant therethrough.

4. A porous wall combustor assembly for a gas turbine engine comprising an annular wall segment of laminated, readily deformable metal, said wall segment including a first sheet and a second sheet, a first means for defining a plurality of continuously formed serpentine grooves formed between each of said first and second sheets, a plurality of holes directed through each of said first and second sheets having a portion thereof in intersecting relationship with said serpentine grooves, each of said first and second sheets having a land portion thereon intermediate said grooves, means for bonding said land portions together, said serpentine grooves having a crossing pattern to form a crossover passage between said grooves, said holes in said sheets serving to direct coolant from exteriorly of said combustor into said serpentine grooves thence for flow therethrough to said crossover passages and for return flow through said grooves for flow from said holes to a point interiorly of said combustor for cooling the inner wall thereof by transpiration cooling, each of said first and second plurality of serpentine grooves having a bend formed therein between each of adjacent ones of the holes which intersect individual ones of said serpentine grooves defining relief between said first and second sheets to produce minimal surface distortion and stretch marks across curvilinear portions of said annular wall segment of said combustor assembly to prevent tears in the surface thereof thereby to maintain a uniform flow of coolant from the exterior of said combustor into the interior thereof.

5. A porous wall combustor assembly for a gas turbine engine comprising an annular wall segment of laminated, readily deformable metal, said wall segment including a first sheet and a second sheet, a first plurality of continuously formed curvilinear grooves formed through part of the depth of each of said first and second sheets, a plurality of holes directed completely through each of said first and second sheets having a portion thereof in intersecting relationship with said curvilinear grooves, each of said first and second sheets having a land portion thereon intermediate said grooves therein, means for bonding said land portions together to locate said grooves in said first and second sheets in an intersecting relationship with one another to form a crossover passage from said grooves in said first sheet to grooves in said second sheet, said holes in said one sheet serving to direct coolant from exteriorly of said combustor into said first grooves thence for flow therethrough to said intersecting passages and for return flow through said grooves in said second sheet for flow from the holes therein to a point interiorly of said combustor for cooling the inner wall thereof by transpiration cooling, each of said first and second plurality of curved grooves having a bend formed therein between each of adjacent ones of the holes which intersect individual ones of said serpentine grooves in said first and second sheets of said wall segments serving to produce minimal surface distortion and stretch marks across curvilinear portions of said annular wall segment of said combustor assembly to prevent tears in the surface thereof thereby to maintain a uniform flow of coolant from the exterior of said combustor into the interior thereof.

* * * * *